United States Patent [19]

Smyth et al.

[11] 4,439,221
[45] Mar. 27, 1984

[54] METHOD FOR MAKING OPTICAL FIBER COUPLERS

[75] Inventors: Lawrence C. Smyth, Kirkland; Alexander W. Lightstone, Montreal, both of Canada

[73] Assignee: Her Majesty the Queen in Right of Canada as represented by the Minister of National Defence, Ottawa, Canada

[21] Appl. No.: 458,021

[22] Filed: Jan. 14, 1983

Related U.S. Application Data

[63] Continuation of Ser. No. 169,988, Jul. 18, 1980, abandoned.

[30] Foreign Application Priority Data

Nov. 1, 1979 [CA] Canada ............................. 339409

[51] Int. Cl.³ ..................... C03B 37/14; C03C 25/06
[52] U.S. Cl. ........................................ 65/4.21; 65/29; 65/31; 156/158
[58] Field of Search ............ 65/4.2, 4.21, 29, 31, 65/152, 155; 350/96.15, 96.21; 264/1.5; 156/148, 158, 229

[56] References Cited

U.S. PATENT DOCUMENTS

| | | | |
|---|---|---|---|
| 3,579,316 | 5/1971 | Dyott et al. ............................ | 65/4.21 |
| 3,585,705 | 6/1971 | Allan ................................ | 65/4.21 X |
| 3,864,018 | 2/1975 | Miller ............................... | 65/4.21 X |
| 3,928,102 | 12/1975 | Rowe et al. ..................... | 350/96.15 X |
| 3,933,455 | 1/1976 | Chown ........................... | 350/96.15 X |
| 3,977,855 | 8/1976 | Cole .................................... | 65/4.21 |
| 4,078,910 | 3/1978 | Dalgoutte ......................... | 65/4.21 X |
| 4,087,156 | 5/1978 | Kao et al. ...................... | 350/96.15 X |
| 4,196,032 | 4/1980 | Eggleston ...................... | 350/96.21 X |
| 4,264,126 | 4/1981 | Sheem ............................... | 350/96.15 |
| 4,291,940 | 9/1981 | Kawasaki et al. .................. | 65/4.2 X |

FOREIGN PATENT DOCUMENTS

2822022 12/1978 Fed. Rep. of Germany ... 350/96.15

OTHER PUBLICATIONS

Fiber Optics, Plenum Press, New York and London, 1979, pp. 473–478, Bendow et al. (Editors).

Primary Examiner—Richard V. Fisher
Attorney, Agent, or Firm—Cushman, Darby & Cushman

[57] ABSTRACT

An apparatus and method are described for making an optical fiber coupler. A pair of optical fibers are supported in predetermined orientation by positioning means. The latter are spaced apart along a common axis. The optical fibers are positioned within tube means of a selected size intermediate the positioning means. In use, the tube means functions as a furnace to distribute heat uniformly to at least a portion of the fibers to fuse the same together. One of the positioning means preferable is rotatable, to enable twisting of the fibers. It is also preferable that at least one fiber has a tensile force applied to it. More preferably, the tensile force is sufficient to cause necking of the heated fiber, thereby forming a biconical section therein. Rotation of one positioning means through about one half revolution normally causes twisting of the biconical section and fusion thereof to the other fiber. Typically, both fibers are subject to a pulling force to create biconical sections. In an automated system the fibers are of indeterminate length, fed through a furnace and simultaneously given a twist to couple and fuse sections of fiber together. The fibers may already have biconical sections therein; or such sections can be formed by applying a sufficient tensile pull to each heated fiber to cause necking of the same. The couplers may be made from two or more optical fibers. Each fiber may be of the same, or different, diameters.

11 Claims, 3 Drawing Figures

METHOD FOR MAKING OPTICAL FIBER COUPLERS

This is a continuation of application Ser. No. 169,988, filed July 18, 1980, now abandoned.

This invention relates to a method and an apparatus used in making an optical fiber coupler. More particularly, a method and apparatus are described for manufacturing tee couplers of a biconical symmetric or asymmetric configuration.

BACKGROUND AND REFERENCE TO PRIOR ART

Two general types of couplers have been developed for use in signal distribution in multiterminal data communications systems. These types of couplers are known as "star" and "tee" couplers. A star coupler can be considered as an optical mixer which links each terminal simultaneously to all other terminals in the communications system. On the other hand, a tee coupler provides at each terminal a capability for injecting or removing a signal from an optical fiber trunk line. The type and strength of that signal is variable. Certain advantages of flexibility in the number and location of the distribution paths are thus available. Moreover, in recent years low-loss tee couplers have been built and tested. These devices have demonstrated excess loss measured at about 0.2 dB, as compared with losses of previous couplers which were an order of magnitude higher.

For a more comprehensive overview of these subjects, the reader is referred to an invited paper by Mr. Thomas G. Giallorenzi published in IEEE proceedings Vol. 66, No. 7 of July, 1978 at page 761; and also to a paper entitled "Low-loss Access Coupler for Multimode Optical Fiber Distribution Networks" by Drs. B. S. Kawasaki and K. O. Hill in *Applied Optics*, Vol. 16, page 1794, 1977.

The former paper concludes that single mode optical fibers offer the optimum in overall propagation performance. However, he has also concluded that exploitation of this performance has been limited by the difficulty in coupling such fibers to other components and to other fibers. These difficulties are manifest, for example, in problems with alignment, and in high losses in coupling or transferring of the optical frequency signal from one fiber to another.

BRIEF DESCRIPTION OF THE INVENTION

The present invention addresses certain aspects of the present day state of this art. As will be more apparent from the details below, this invention describes an improved method, and an apparatus for making low-loss tee couplers. The present invention describes a form of apparatus, by way of example only, which persons can be taught to use after a very short training period. Optical fiber couplers made using the method of this invention have already demonstrated as having very acceptable coupling losses of only about 0.2 dB.

According to one aspect of this invention, therefore, there is provided a method of making optical fiber couplers from a pair of optical fibers comprising; positioning the fibers in a predetermined orientation; applying a tensile load to at least one of the fibers; heating the fibers to cause softening of the same; and, twisting the fibers together when hot, to fuse the same to one another. In a more preferred form of the invention, the optical fibers are tensioned, during heating, sufficiently strongly to cause necking of each creating biconical sections therein, the fibers being twisted through about one half revolution to twist and fuse the biconical sections together. In a still more preferred method, the cladding of each biconical section is etched before fusing to a predetermined thickness, expressed in percent of the core diameter, i.e., typically to a cladding thickness in the range of 5 to 25% of the core diameter.

According to another aspect of the invention, there is provided an apparatus adapted to make an optical fiber coupler from at least a pair of optical fibers, comprising: first and second positioning means spaced apart longitudinally of a common axis, the positioning means each being adapted to support and maintain the optical fibers in a predetermined position; tube means mounted along the axis and between the positioning means, the tube means being of a predetermined size to accomodate positioning therein of a portion of the optical fibers, and being operative, in use, for distributing heat to the fibers for fusing the same together; and a heat source positionable to heat the tube means and fibers therein to fuse the latter together. In a preferred form of this apparatus one of the positioning means is rotatable to enable twisting of the fibers. In a more preferred arrangement, pulling means are also provided to apply a predetermined tensile load to the heated fibers.

These and other features and advantages of this invention will become apparent from the detailed description below. That description is to be read in conjunction with the accompanying formal drawings. These drawings illustrate by way of example only a laboratory prototype of one form of apparatus with which the method embodied in the present invention can be carried out.

DETAILED DESCRIPTION OF PREFERRED EMBODIMENTS

Figure 1:
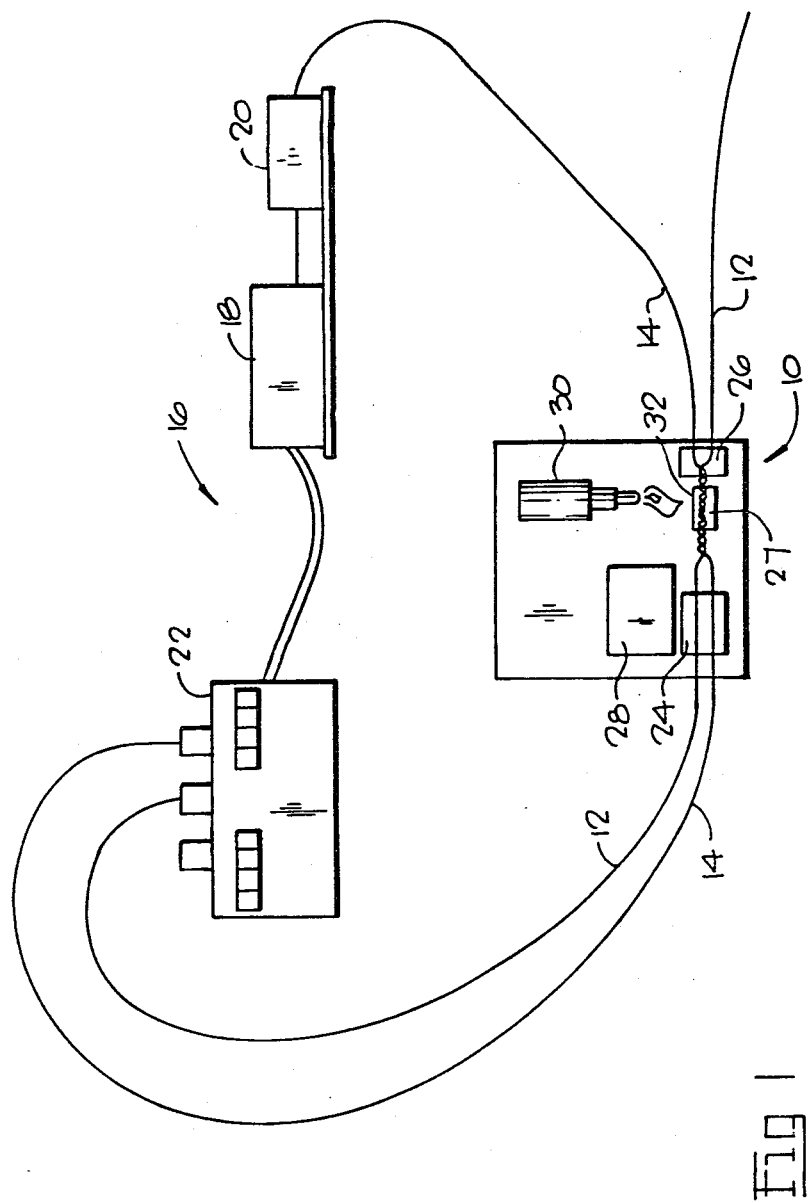
FIG. 1 illustrates a system in which a manufacturing jig to be described below, is used in accordance with the present invention to produce optical fiber couplers.

Turning now to FIG. 1, there is shown a system of equipment for making optical fiber couplers in accordance with a specific method embodied by this invention. Thus, a particular form of jig is shown schematically at 10. This jig 10, to be described more fully below, is connected by strands of optical fiber 12, 14 to an On-line Measurement Unit (OLMU) 16. The OLMU consists of a Burrus Diode current source 18, a IRE-160FB Burrus Diode, (i.e., of Laser Diode Labs) with a 0.27 numerical aperture, fiber pigtail 20 as a source, and a two channel optical power measurement unit 22 having a digital display. These elements are connected one to another, as illustrated in FIG. 1.

The jig 10 basically includes first and second positioning means 24 and 26, each adapted to place and retain the fibers 12 and 14 in a predetermined orientation. The positioning means 24 and 26 are spaced apart longitudinally of a common axis. One of the positioning means 24 and 26 is rotatable about that axis to enable the fibers 12 and 14 to be twisted to form a coupler 27. Pulling means shown overall at 28 are also provided, selectively to apply a predetermined tensile load to at least one of the fibers 12 and 14. Typically, this tensile load is about one gram. For an optical fiber of 125 microns outer diameter and 85 micron core diameter that 1 gram tensile force caused necking of the fiber when heated. Such necking causes a biconical tapered section to be created in the fiber. For fibers of other diameters and depending on the qualities of the glass such a force may have to be increased slightly to cause necking. Heating means 30, are movably supported on the jig 10 to heat and fuse the fibers 12 and 14 together. As suggested in FIG. 1, heating means 30 is typically a flame. Alternative heating devices are also possible, i.e., electric arc, microwaves and the like, this clearly depending upon the production rate being met. Heating means 30 herein heats tube means 32, the latter being a quartz tube acting as a furnace to distribute heat to the fibers. Subsequently, the tube serves as a protective encapsulant (protective package) in which the coupler is sealed prior to final packaging.

During manufacture of an optical fiber coupler, the OLMU 16 measures the coupling ratio and loss. Calibration following a warm-up period is done at an appropriate time. In operation, a square wave oscillator in the OLMU 16 supplies current pulses to the Burrus Diode 18. Light from this diode 18 passes through the coupler 27 and is monitored by two detectors, one for each exit port of the coupler 27. The sum of light from these detectors is shown, for example, on the left digital meter 22 of the OLMU 16 while the right digital meter thereof displays the signal of either one of the two detectors. When the signal received from each exit port yields the same readout, the coupler 27 will provide for substantially equal coupling of an input signal into two output ports. Using the present invention, three (3) and four (4) port couplers have been made with the apparatus described above. Such couplers were made from the following fibers:

1. "Phasil"* (90$\mu$ core diameter, 125$\mu$ outer diameter)
2. Corning "Corguide"* graded index fiber (62.5 core diameter, 125$\mu$ outer diameter)
3. Corning step index fiber (85$\mu$ core diameter, 125$\mu$ outer diameter)
4. Corning step index fiber (100$\mu$ core diameter, 140$\mu$ outer diameter)
5. Bell Laboratories (U.S.A.) fiber (55$\mu$ core diameter, 110$\mu$ outer diameter)
6. Times graded index fiber, G6 (90$\mu$ core diameter, 125$\mu$ outer diameter).

*—A Trademark.

Figure 2:
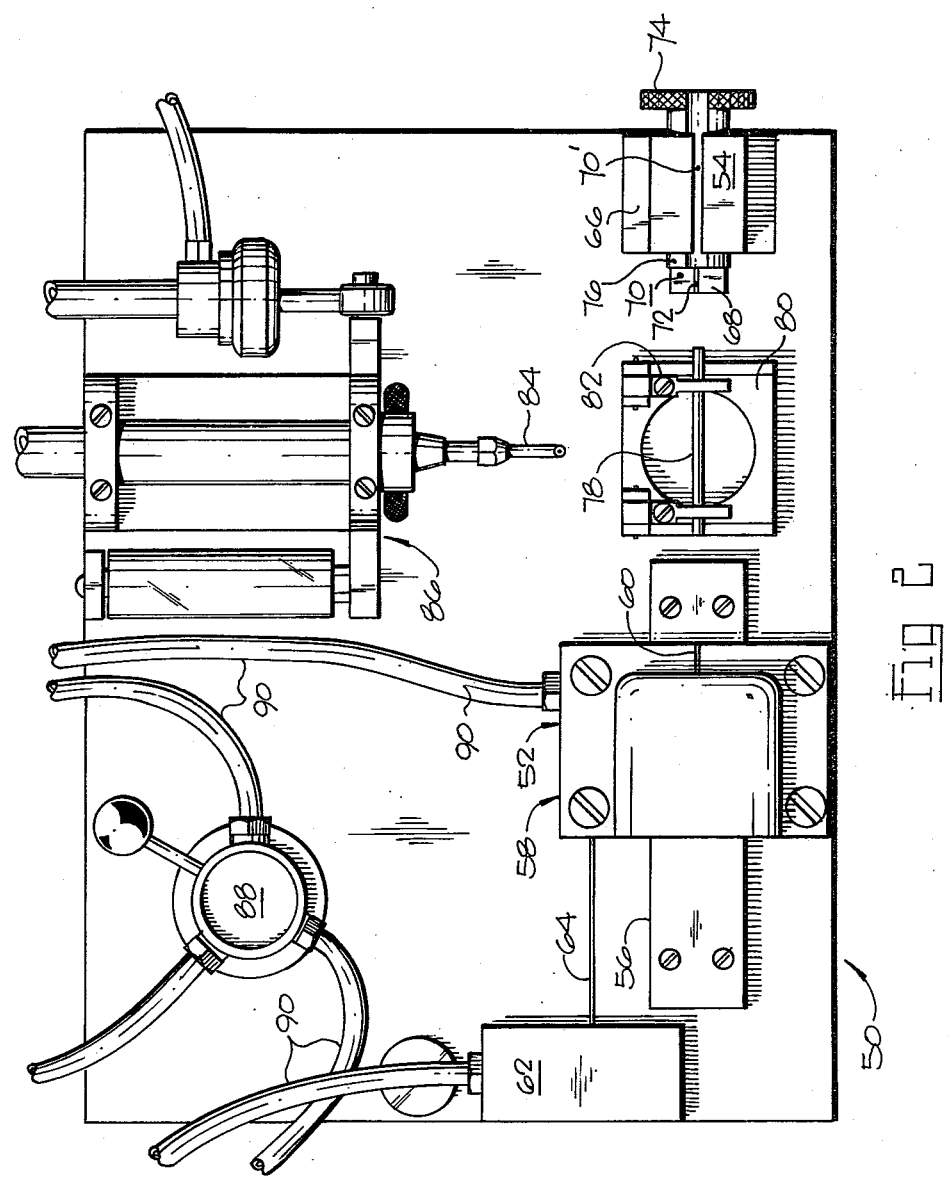
FIG. 2 is a schematic drawing showing the lab prototype of a manufacturing jig with which the method aspect of this invention can be practiced.

Turning now to FIG. 2, one specific form of a jig embodied by this invention is shown overall at 50. The jig 50 includes two positioning means 52 and 54. In this instance positioning means 52 comprises a base 56 and an air bearing slide 58. The slide 58 has at least one longitudinally extending groove means 60 thereon. Sections of optical fiber from which a coupler is to be made are placed in the groove means 60 and therein by retaining means, not shown, e.g. a magnetic clamp. Connected to the slide 58 is pulling means 62, in this instance in the form of an air bearing pulley. The pulling means 62 functions to apply a tensile pull or force to the optical fibers held on positioning means 52. Here, pulling means 62 includes a gravity operated weight of one gram, on one end of a thread or cord 64 which is connected to the slide 58.

The second positioning means 54 is spaced apart of positioning means 52, longitudinally of an axis extending parallel to groove means 60. Preferably, the groove means 60 is coaxial of that axis. Positioning means 54 includes base portion 66 and a rotatably movable upper portion 68. In this case upper portion 68 includes two coaxially cylindrical sections 70,70' the former also flattened on one side and also formed with groove means 72. A knurled or ribbed handle 74 is connected to cylindrical sections 70,70' to enable turning the same as required. The groove means 72 is coaxially located relative to groove means 60 in the first positioning means 52. The movable portion 68 also has fiber retaining means thereon shown schematically at 76. Such retaining means 76 can be in the form of complementary grooved magnetic bars, a spring activated strip or the like, and provides a suitably firm retaining force on the delicate optical fibers from which a coupler is being made.

Tube means in the form of a quartz tube 78 is located on a heating platform 80 between the positioning means 52 and 54. The platform 80 is so arranged as to position the quartz tube 78 coaxially of the groove means 60 and 72. Typically, the tube 78 is about 4.5 cm long with an inside diameter of 2 mm and an outside diameter of 3 mm. However, these dimension are clearly variable to accomodate fibers and greater numbers of fibers of different diametrical dimensions. Magnetic clamps shown at 82 conveniently held the tube 78 in place.

Heating means 84 are positioned adjacent the heating platform 80. The heating means 84 are movable along a track arrangement from a retracted "no-heat" position (shown in FIG. 2) to a "heat" position in which thermal energy is applied to the quartz tube 78. The heating means 84 is in the form of a micro-torch, as shown here. Alternatively, heating means 84 can be in other forms, e.g., as microwaves, an electric arc, or the like. In any event, the heating means 84 supply heat to the tube 78 which distributes the same to the sections of optical fiber therein to soften and fuse the latter together. The tube 78 thus acts somewhat as a furnace. However, it also protects the delicate optical fibers from physical damage during heating as well as from contamination of the coupler by combustion products, or the like. It should be noted here that the gases burned in torch 84 can vary. Different gases provide different flame temperatures and thus one takes into account the properties of the specific glasses from which the optical fiber is made. In the jig 50 of FIG. 2, the heating means 84 is removably supported on a suitable frame or platform indicated at 86.

There is also shown in FIG. 2 an air control valve 88. The valve 88 is typically manually operable. This valve 88 has assorted pneumatic tubing 90 attached to it to interconnect a suitable source of air under pressure to the air bearing pulley, heat source platform, and slide, 62, 86 and 52, as required. The torch 84, for example, is easily movable on its track arrangement when pressurized air is supplied to the heat source platform 86. Closing off that supply of pressurized air effectively "fixes" the platform 86 in the position selected.

The following will describe the method involved when the specific apparatus of FIG. 2 is used to make an optical fiber coupler according to the present invention. It is to be understood that adequate supplies of pressurized air, of propane and oxygen are available, along with the necessary flow meters, regulating valves etc. For use of the torch 84, the oxygen and propane pressures were set at 3 psi using a gas regulator. With the torch lit the gas flows were adjusted to provide a stable flame. Typically an adequate setting was propane—28 cc/min on dial; oxygen 108 cc/min on dial.

Apply compressed air to the compressed air regulator valve (not shown) which has been supplied with the jig 50. One output of this valve is connected to the air bearing pulling means 62, and another is connected to the control valve 88 which should be placed convenient to the operator. The output of the control valve 88 goes to the air bearing slide 58. Set the compressed air regulator valve to 6 psi.

Put the control valve, for example, in a position "A" and check that the slide 58 moves without friction. Hold the thread 64 connecting the slide 58 to the weight in pulling means 62 and adjust the jig's leveling knob until the slide is free. Set the slide 58 at the 12.5 mm position. Return the control valve to, for example, a position "B".

Prepare two 4 meter long pieces of optical fiber for the coupler by removing the fiber's protective coating over five centimeters in their middles. Position each of these fibers in one groove means 72 of the rotatable positioning means 54, and, after ensuring that their cleaned surfaces are located symmetrically with respect to the heating platform 80, secure the fibers in place with a magnetic clamp.

Thread the fibers through the quartz tube 78 (4.5 cm long, 3 mm O.D., 2 mm I.D.) and seat the tube in the heating platform 80. Lower the magnetic clamps to hold the tube 78 securely. Untangle the fibers from one another and place each one in groove means 60 of the air bearing slide 58.

Return the control valve 88 to the "A" position and check that the fibers are aligned in the tube 78.

Carefully cleave one fiber end and butt it to the pigtail of the Burrus Diode (FIG. 1). Then secure it in position. Cleave the other end of this fiber and place it in one detector B of the OLMU. Cleave the end of the other fiber and place in the other detector C of the OLMU. Turn the current adjust knob until the display reads 10.0. With the channel selector switch at 3, the right hand display should read 10.0 (within 2%) and with the channel selector switch at 4, the right hand display should read 0. Rotate the movable portion of positioning means 54 1½ turns (540°). Check that the fibers are not touching the inner walls of the quartz tube 78. Observe the reading on the digital display of the OLMU as the heat is applied and the pulling means 62 stretches the heated fibers. The right display should slowly change from 10.0 to about 9.0, and the left display should increase from 0 to as high as 4.0. A reading of 2.0 on the right display indicates 20% coupling; a reading of 4.0 on the right display indicates 40% coupling, etc. Remove the torch 84 from the tube 78 slowly as the coupling coefficient desired is reached.

The refractive index is slightly different in the hot fibers as opposed to the fibers when they cool. Consequently, for coupling ratios less than 10%, the OLMU gives an inaccurate indication of coupling. With experience, however, one can correlate the reading on the OLMU when the fibers are hot, with that when it is cool.

Once the coupled fibers have cooled, dab Devcon* 5 minute epoxy to either side of the quartz tube 78. After allowing one minute for the epoxy to set, apply a slight tension to the air slide 58 so as to pull the fibers taut, simultaneously return the control valve 88 to the "B" position. Once the epoxy has set, note the reading on the left digital meter which indicates the percentage of power transmitted by the coupler. A reading of 9.0, for example, indicates that 90% of the light entering the coupler passes through it, and only 10% is absorbed. Typically, the reading on the digital voltmeter will be 8.9±0.5.

*Trademark

The following tables indicate the resultant loss and coupling which was achieved in various fibers. These measurements were made prior to final encapsulation. The couplers from any particular fiber were made one after another.

TABLE A (A) Couplers fabricated from Corning graded index fiber, 62.5 micron core diameter, 125 micron outer diameter, NA = .20
Target for coupling ratio = 40 ± 4%
Propane flow = 24.0 on dial ~28 cc/min
Oxygen flow = 68.0 on dial ~108 cc/min

|     | Coupling | Loss |
| --- | --- | --- |
| 1.  | 42% | 5%  |
| 2.  | 42% | 7%  |
| 3.  | 35% | 29% |
| 4.  | 40% | 8%  |
| 5.  | 40% | 9%  |
| 6.  | 40% | 5%  |
| 7.  | 39% | 17% |
| 8.  | 40% | 14% |
| 9.  | 40% | 10% |
| 10. | 40% | 15% |
| 11. | 42% | 7%  |
| 12. | 41% | 8%  |
| 13. | 38% | 17% |
| 14. | 41% | 10% |
| 15. | 40% | 9%  |

Average loss = 11.3%
Standard deviation of loss = 6.2%

TABLE B (B) Couplers fabricated from Corning step index fiber, 100 micron core diameter, 140 micron outer diameter, NA = .30
Target for coupling ratio = 40 ± 4%
Propane flow = 24.0 on dial ~28 cc/min
Oxygen flow = 68.0 on dial ~108 cc/min

|     | Coupling | Loss |
| --- | --- | --- |
| 1.  | 39% | 6%  |
| 2.  | 41% | 2%  |
| 3.  | 42% | 3%  |
| 4.  | 42% | 5%  |
| 5.  | 40% | 4%  |
| 6.  | 31% | 36%+ |
| 7.  | 42% | 4%  |
| 8.  | 40% | 2%  |
| 9.  | 42% | 3%  |
| 10. | 41% | 2%  |
| 11. | 41% | 9%  |
| 12. | 41% | 2%  |
| 13. | 42% | 2%  |
| 14. | 41% | 3%  |
| 15. | 39% | 6%  |
| 16. | 42% | 5%  |

Average loss = 3.9%
Standard deviation of loss+ = 4.1%
+No. 6 eliminated by Chauvenet's criterion.

TABLE C (C) Couplers fabricated from Canada Wire step index Phasil fiber, 90 micron core diameter, 125 micron outer diameter, NA = .26
Target for coupling ratio = 20 ± 4%
Propane flow = 16.0 on dial ~10 cc/min
Oxygen flow = 50.0 on dial ~68 cc/min

|     | Coupling | Loss    |
| --- | -------- | ------- |
| 1.  | 23%      | 7%      |
| 2.  | 20%      | 7%      |
| 3.  | 21%      | 3%      |
| 4.  | 22%      | 4%      |
| 5.  | 21%      | 15%     |
| 6.  | 22%      | 2%      |
| 7.  | 23%      | 9%      |
| 8.  | 21%      | 4%      |
| 9.  | 20%      | 30%++   |
| 10. | 25%      | 4%      |
| 11. | 22%      | 4%      |
| 12. | 21%      | 1%      |

*Average loss = 5.5%
Standard deviation of loss++ = 3.9%
*++No. 9 eliminated by Chauvenet's criterion.

In carrying out the process steps noted above, it is to be recognized that the optical fiber couplers made will preferably be of a symmetric or asymmetric biconical configuration. Moreover, there are certain basic considerations to be taken into account.

The selection of fibers available from the various fiber manufacturers is limited. Consequently, an asymmetric coupler may, of necessity, be composed of fibers originating from two different sources. In the fusion technique used herein to provide optical and mechanical contact, the glass used in both fibers ought to have similar softening and melting characteristics. However, if the glasses are not the same, since the main fiber of an asymmetric coupler must be kept thicker than the secondary fiber, it is desirable for the secondary fiber to have a lower softening point. Moreover, the refractive index of the clad on the two fibers should be very nearly equal to permit mixing of the clad modes in the coupling region.

Further, by fixing the secondary fiber, the production technique can be standardized and thereby made more economical. Moreover, it is simpler for the user to choose the system he requires, i.e., he needs only to decide on the main fiber.

An asymmetric coupler can be manufactured with a technique similar to that of the symmetric coupler. That is to say, a modified version of the above method is used. Typically, a microtorch is used to heat the fibers and taper them. In the case of an asymmetric coupler manufactured using fibers of different numerical aperture, tapering of each fiber is preferably done separately and the results monitored either under a microscope, or by carefully monitoring the elongation of the fiber. The two fibers, i.e., the primary, and secondary fibers are then fused or glued together at their tapered regions. In the case of dissimilar fibers, gluing, with an appropriate index matching adhesive, may be necessary. Finally, a quartz tube is slipped over the tapered region of the two fibers, and sealed.

To ease manufacture, of an asymmetric coupler the recommended secondary fiber is a "Phasil"* fiber from Canada Wire and Cable Limited, having a core radius of 15 microns. In a typical case where this fiber is used, the calculated coupling efficiency can be as high as 88%. Coupling from the main fiber to the secondary is as low as 10%. It is noted that the tapering and fusing of the fibers to one another requires more complicated procedures than is the case with simple symmetric couplers. This is particularly so when the main and secondary fibers have different numerical apertures. However, the mechanical housing of such a coupler can be the same as that for a symmetric coupler.

*—A Trademark.

In manufacturing moderate quantities of couplers the on-line measuring unit (OLMU) can readily be used to ensure accuracy in the coupling efficiency. Similarly, the taper sections, i.e., biconical sections may have been prepared in lengths of optical fiber, in advance. Thus, the above method would simply involve applying sufficient tension to hold the fiber taut, while gluing or fusing the same together. Also, as noted earlier, it is preferable but not essential, to twist the heated or glued fibers before a final "set" is taken, to promote better coupling.

To accomodate large volume production, it is expected that two or more optical fibers of indefinite length would be fed into a furnace or zone of heat. Knowing the physical and chemical properties of the fibers being used, a controlled heating and softening of selected ones of the fibers is effected. If tapered sections were not already included in any of these fibers, a controlled tensile force would be applied. By balancing the softening of the fiber with the tensile load applied, a controlled slow tapering of the fibers produces a biconical section as envisaged in a preferred embodiment of the process described herein. In this arrangement the OLMU is not used. Further, containment within a glass (quartz) tube could be effected using complementary semi-cylindrical sections glued or fused together. Similarly twisting of the softened fibers could be implemented, say, by a half twist in one direction for one coupler, followed by a half twist in the opposite direction for the following coupler.

Figure 3:
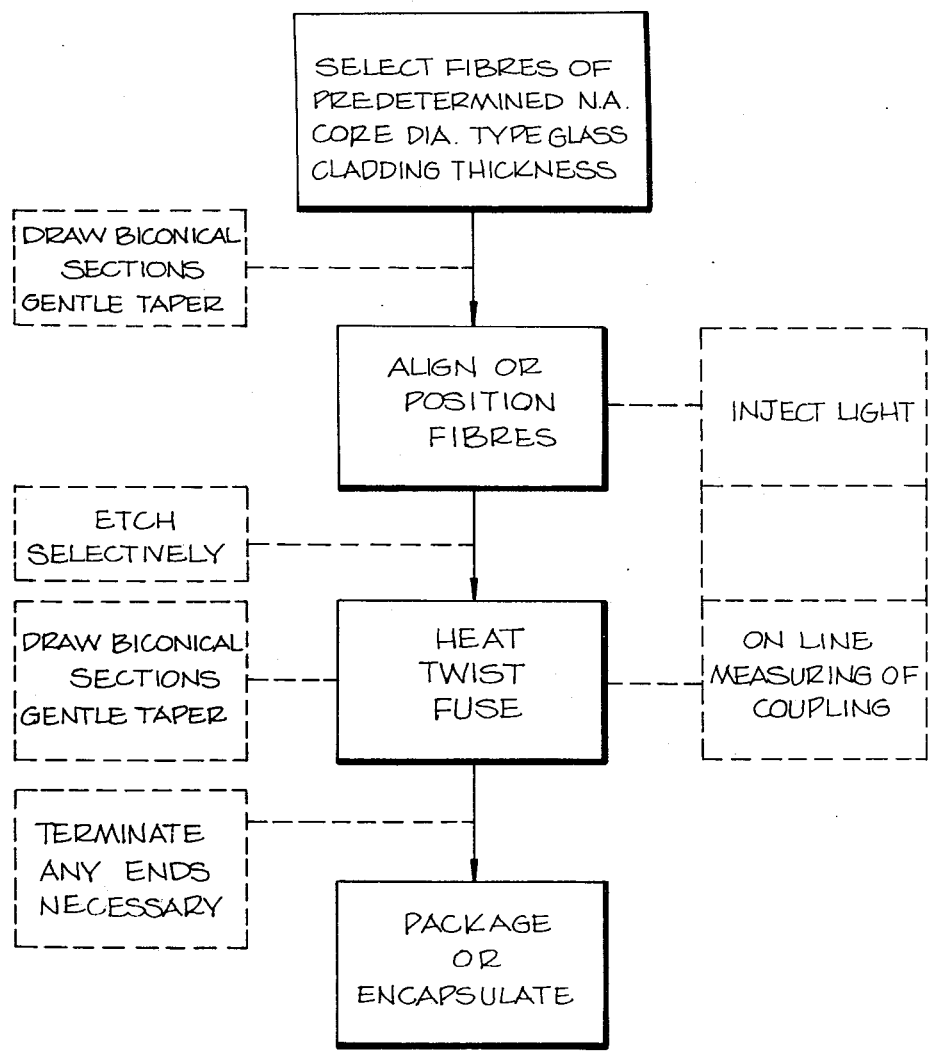
FIG. 3 represents schematically a flow chart of the operations utilized in making an optical fiber coupler in a biconical configuration, according to a preferred embodiment of this invention.

FIG. 3 illustrates schematically the basic steps of the method envisaged herein, together with a number of optional steps depending on the type and volume of production desired.

As noted earlier, it is also preferable herein to etch the cladding thickness to an amount which is from 5 to 25% of the core diameter. This etching is done in an acid bath (a solution of nitric and hydrochloric acids) and occurs prior to heating, softening and stretching, and fusing of the fibers. Etching may be overall, i.e., peripherally of the fiber, or over only selected portions, say, 180° of the cladding.

It is evident from the foregoing that a number of specific variations in both method and apparatus are described within the context of this invention. Other variants will be seen by persons knowledgeable in this art. It is intended to encompass in the claims below all such variants which embrace changes and modifications to the preferred embodiments described herein, and which will be apparent to those persons skilled in this art.

The embodiments of the invention in which an exclusive property or privilege is claimed are defined as follows:

1. A method of making an optical fiber coupler from a pair of optical fibers, comprising:
 positioning said fibers in a predetermined orientation in a protective tube;
 applying a tensile load to at least one of said fibers;
 heating said fibers by applying heat to said tube which thereby functions as a furnace for distributing heat uniformly to said fiber portions therein to cause softening of the same;

twisting said fibers together when hot to fuse the same to one another and sealing said fibers within said tube to fix the fibers and produce a protective package for said coupler.

2. The method defined in claim 1, wherein said tensile load is applied at a sufficiently high level to cause necking of said one fiber and creating a biconical section therein, said twisting of the heated fibers then enabling the same to be fused together at said biconical section.

3. The method defined in claim 1, wherein both fibers are pulled sufficiently to cause necking of each to create biconical sections therein, said fibers being twisted through about one half revolution to twist and fuse the biconical sections together.

4. A method of making an optical fiber coupler from at least a pair of optical fibers, comprising:
   (a) selecting the optical fibers having a predetermined diameter, core and cladding thickness and characteristics to confer desired properties to the coupler;
   (b) positioning the selected fibers in a predetermined orientation in a protective tube;
   (c) applying a predetermined tensile load to at least one of the fibers;
   (d) heating a selected portion of the fibers by applying heat to said tube which thereby functions as a furnace for distributing heat uniformly to said fiber portions therein to cause softening of the same;
   (e) twisting the heated fibers to fuse the same to one another at said selected portion; and
   (f) sealing said fibers within said tube to fix the fibers and to thereby package the optical fiber coupler so formed and protect the same.

5. The invention defined in claim 4, wherein the tensile load applied is sufficient to cause gentle tapering of the heated portion of the fibers to create biconical sections therein.

6. The method defined in claim 4, wherein an on-line measuring unit is optically connected to one of the fibers and is operated to inject a measured quantity of light into the fiber, output ports from two of said fibers also being connected optically to said measuring unit, whereby optical signals from said output ports enable a direct measurement of coupling of the injected light into the second fiber, said heating and twisting being stopped when a selected coupling has been achieved.

7. The method defined in claim 4, wherein optical fibers of different diameters are selected, and each is heated and subjected to a tensile load independently, thereby separately forming biconical sections in each fiber, such fibers subsequently being twisted to fuse the same and form said couplers.

8. The method defined in claim 4, wherein an optically compatible adhesive is applied to the twisted fibers to ensure complete bonding of the fibers together.

9. The method defined in claim 4, wherein at least one of the selected fibers is etched over said selected portion thereof to reduce the thickness of cladding thereon to an amount of about 5 to 25% of the core diameter, such etching being carried out prior to heating and twisting to fuse the fibers together.

10. A method of making an optical fiber coupler from at least a pair of optical fibers, comprising:
   (a) selecting predetermined optical fibers of a core diameter, cladding thickness and physical characteristics to confer desired properties to the coupler;
   (b) positioning a portion of the selected fibers in a predetermined orientation in a protective tube;
   (c) applying a predetermined tensile load to said fibers;
   (d) heating said portion of the fibers under tension by applying heat to said tube which thereby functions as a furnace for distributing heat uniformly to said portion of fibers therein to cause softening and gentle stretching of the same, thereby forming a biconical section in each said fiber;
   (e) twisting the heated, softened fibers to fuse the biconical sections together; and
   (f) sealing said fibers within said tube to fix the fibers and provide protective packaging to the coupler so formed.

11. The method defined in claim 10, wherein the heating, softening, stretching and twisting of the fibers is carried out simultaneously.

* * * * *